US012812282B2

(12) United States Patent
Ledingham et al.

(10) Patent No.: US 12,812,282 B2
(45) Date of Patent: Nov. 24, 2026

(54) EXTENDING ANTENNA EARTH PLANE

(71) Applicant: Bose Corporation, Framingham, MA (US)

(72) Inventors: Stephen Ledingham, Waltham, MA (US); Marko Kupari, Kempele (FI); Sami Hienonen, Oulu (FI)

(73) Assignee: Bose Corporation, Framingham, MA (US)

( * ) Notice: Subject to any disclaimer, the term of this patent is extended or adjusted under 35 U.S.C. 154(b) by 382 days.

(21) Appl. No.: 18/110,679

(22) Filed: Feb. 16, 2023

(65) Prior Publication Data

US 2024/0284084 A1 Aug. 22, 2024

(51) Int. Cl.

*H04R 1/10* (2006.01)
*H01Q 1/27* (2006.01)
*H01Q 1/48* (2006.01)
*H04R 1/1025* (2026.01)

(52) U.S. Cl.

CPC .......... *H04R 1/1041* (2013.01); *H01Q 1/273* (2013.01); *H01Q 1/48* (2013.01); *H04R 1/1016* (2013.01); *H04R 1/1025* (2013.01); *H04R 1/1075* (2013.01); *H04R 2420/07* (2013.01)

(58) Field of Classification Search

CPC . G04R 60/02; G06F 3/04144; G10K 11/1785; H01Q 1/243; H01Q 1/273; H01Q 1/36; H01Q 1/48; H01Q 9/42; H04R 1/1001; H04R 1/1016; H04R 1/1025; H04R 1/1041; H04R 1/105; H04R 1/1066; H04R 1/1075; H04R 1/12; H04R 1/48; H04R 2420/07; H04R 2460/09; H04W 4/80

USPC .......... 381/74, 328, 375, 381; 343/795, 843; 368/88

See application file for complete search history.

(56) References Cited

U.S. PATENT DOCUMENTS 10,129,635 B1 * 11/2018 Zhu .................... H04R 1/1091
10,827,249 B1 * 11/2020 Pine .................... H04R 1/1041
10,944,157 B2 3/2021 Chen
11,115,745 B2 * 9/2021 Grebe .................... H04R 1/02
11,310,581 B1 * 4/2022 Shanmugam ............ H01Q 9/40
11,525,703 B2 12/2022 Chen
11,641,542 B2 * 5/2023 Backe .................... H04R 1/12 381/74

(Continued)

FOREIGN PATENT DOCUMENTS

CN 106454607 A 2/2017
CN 213186503 U 5/2021
EP 2710671 B1 7/2017

OTHER PUBLICATIONS

Artner, Gerald et al., A MID Dipole Antenna in LDS Technology, 24th Telecommunications forum TELFOR 2016, Serbia, Belgrade, Nov. 22-23, 2016, 978-1-5090-4086-5/16/$31.00 © 2016 IEEE.

(Continued)

*Primary Examiner* — Gerald Gauthier

(57) ABSTRACT

A headphone includes a housing that contains an electro-acoustic transducer, an antenna for wireless communication, and printed circuit board (PCB) with electronics for driving the electro-acoustic transducer. The PCB includes an earth plane electrically that is coupled to the antenna. A transceiver provides for wireless communication via the antenna, e.g., to a mobile phone or similar. The headphone also includes an earth plane extension formed on portion of housing.

22 Claims, 13 Drawing Sheets

(56) References Cited

U.S. PATENT DOCUMENTS

| | | | | |
|---|---|---|---|---|
| 11,765,495 | B2 * | 9/2023 | Pine | H04R 1/1041 381/380 |
| 2002/0102005 | A1 * | 8/2002 | Lin | H04R 1/1066 381/381 |
| 2005/0104795 | A1 * | 5/2005 | Voigtlaender | H01Q 1/48 343/700 MS |
| 2005/0219955 | A1 * | 10/2005 | Xu | G04R 60/02 368/88 |
| 2006/0177083 | A1 * | 8/2006 | Sjursen | H04R 19/016 381/322 |
| 2008/0166004 | A1 * | 7/2008 | Sanford | H01Q 1/243 343/904 |
| 2016/0064824 | A1 * | 3/2016 | Monteix | H01Q 9/42 343/843 |
| 2016/0134957 | A1 * | 5/2016 | Jentz | H04R 1/105 381/380 |
| 2016/0205461 | A1 * | 7/2016 | Fernandez-Medina | H01Q 7/00 381/74 |
| 2016/0276740 | A1 * | 9/2016 | Monteix | H01Q 1/36 |
| 2020/0068283 | A1 * | 2/2020 | Chou | H04R 1/1025 |
| 2020/0100011 | A1 * | 3/2020 | Bruss | H04R 1/1016 |
| 2020/0162806 | A1 * | 5/2020 | Trainer | G10K 11/17857 |
| 2020/0221209 | A1 | 7/2020 | Grebe et al. | |
| 2021/0112301 | A1 * | 4/2021 | Carney | H04R 1/1041 |
| 2022/0278441 | A1 | 9/2022 | Kodama | |
| 2022/0352621 | A1 * | 11/2022 | Zachara | H01Q 9/42 |
| 2022/0353598 | A1 | 11/2022 | Miller | |
| 2022/0369049 | A1 | 11/2022 | Ledingham | |
| 2022/0385326 | A1 * | 12/2022 | Colen | H04W 4/80 |
| 2023/0091575 | A1 * | 3/2023 | Koneru | H04R 1/1016 381/328 |
| 2023/0269514 | A1 * | 8/2023 | Cousins | G06F 3/04144 381/74 |
| 2023/0421940 | A1 * | 12/2023 | Luo | H04R 1/1066 |
| 2024/0048891 | A1 * | 2/2024 | Sarbou | H04R 1/1075 |
| 2024/0284084 | A1 * | 8/2024 | Ledingham | H04R 1/1025 |

OTHER PUBLICATIONS

International Search Report and Written Opinion dated Jul. 18, 2024 for International Application No. PCT/US2024/016204.

* cited by examiner

EXTENDING ANTENNA EARTH PLANE

BACKGROUND

At least one example in accordance with the present disclosure relates generally to wireless headphones, and, in particular, to wireless headphones with improved wireless performance.

SUMMARY

All examples and features mentioned below can be combined in any technically possible way.

In one aspect, a headphone includes a housing that contains an electro-acoustic transducer, an antenna for wireless communication, and printed circuit board (PCB) with electronics for driving the electro-acoustic transducer. The PCB includes an earth plane electrically that is coupled to the antenna. A transceiver provides for wireless communication via the antenna, e.g., to a mobile phone or similar. The headphone also includes an earth plane extension formed on portion of housing.

Implementations may include one of the following features, or any combination thereof.

In some implementations, the earth plane extension is formed directly on a surface of the housing using laser direct structuring (LDS).

In certain implementations, the antenna is formed directly on a surface of the housing using LDS.

In some cases, the housing includes a first housing portion and a separate, second housing portion that are mechanically secured together. The earth plane extension may be formed directly on a surface of the first housing portion using LDS and the antenna may be formed directly on a surface of the second housing portion using LDS.

In certain cases, the housing defines an acoustic enclosure that is configured to be located substantially in a concha of an outer ear of a user, and an electronics enclosure that is configured to pass over the outer side of the ear.

In some examples, the electro-acoustic transducer is disposed within the acoustic enclosure and the PCB is disposed within the electronics enclosure. The antenna may be located over the electro-acoustic transducer and may extend away from the PCB.

In certain examples, at least a portion of the earth plane extension is disposed within the acoustic enclosure.

In some implementations, a first portion of the earth plane extension is disposed within the acoustic enclosure and a second portion of the earth plane extension is disposed within the electronics enclosure.

In certain implementations, the headphone includes a battery module and a connecting portion. The battery module contains a battery and is configured to be located behind the outer ear, and the connecting portion mechanically couples the acoustic module to the battery module.

In some cases, a flexible printed circuit extends through the connecting portion and electrically connects the PCB to the battery.

In certain cases, electrically conductive traces on the flexible printed circuit are RF coupled with the earth plane and the battery.

In some examples, the electronics enclosure is configured to pass over one or more of a helix, an anti-helix, a lobule, and/or an anti-tragus of the user's ear and the connecting portion is configured to pass over an outer edge of the user's ear at a location of one or more of the helix, the anti-helix, and/or the lobule of the user's ear when the headphone is worn.

In certain examples, at least a portion of the earth plane extension is configured to sit between a user's cavum conchae and the antenna when the headphone is worn.

In another aspect, an open-ear headphone includes an acoustic module, a battery module, and a connecting portion that mechanically couples the acoustic module to the battery module. The acoustic module is configured to be located at least in part in a concha of an outer ear of a user and includes an electro-acoustic transducer and a first sound-emitting opening that is configured to emit sound produced by the acoustic transducer. The acoustic module also includes an antenna and a printed circuit board (PCB) that is electrically coupled to the electro-acoustic transducer. The PCB includes an earth plane that is electrically coupled to the antenna. The battery module contains a battery and is configured to be located behind the outer ear. The connecting portion includes conductive elements that electrically connect the battery to the PCB. The conductive elements are radio frequency (RF) coupled to the earth plane.

Implementations may include one of the above and/or below features, or any combination thereof.

In some implementations, the acoustic module includes a housing that encloses the electro-acoustic transducer, the antenna, and the PCB, and an earth plane extension is disposed on (e.g., in direct contact with) a surface of the housing and is electrically connected to the earth plane.

In certain implementations, the earth plane extension is formed directly on a surface of the housing using laser direct structuring (LDS).

In some cases, the housing is a multi-piece housing that includes a first housing portion and a second housing portion. The earth plane extension may be formed directly on a surface of the first housing portion using LDS and the antenna may be formed directly on a surface of the second housing portion using LDS.

In certain cases, the housing defines an acoustic enclosure that is configured to be located substantially in a concha of an outer ear of a user, and an electronics enclosure that is configured to pass over the outer side of the ear.

In some examples, the electro-acoustic transducer is disposed within the acoustic enclosure and the PCB is disposed within the electronics enclosure. The antenna may be located over the electro-acoustic transducer and may extend away from the PCB.

In certain examples, the electro-acoustic transducer is RF decoupled on the PCB.

In some implementations, at least a portion of the earth plane extension is disposed within the acoustic enclosure.

In certain implementations, a first portion of the earth plane extension is disposed within the acoustic enclosure and a second portion of the earth plane extension is disposed within the electronics enclosure.

In some cases, the acoustic enclosure is arranged substantially perpendicular to the electronics enclosure.

In certain cases, the conductive elements include electrically conductive traces on a flexible printed circuit that extends between the PCB and the battery.

In some examples, the earth plane extension is arranged to sit between the user's ear and the antenna when the headphone is worn.

DETAILED DESCRIPTION

Figure 1A:
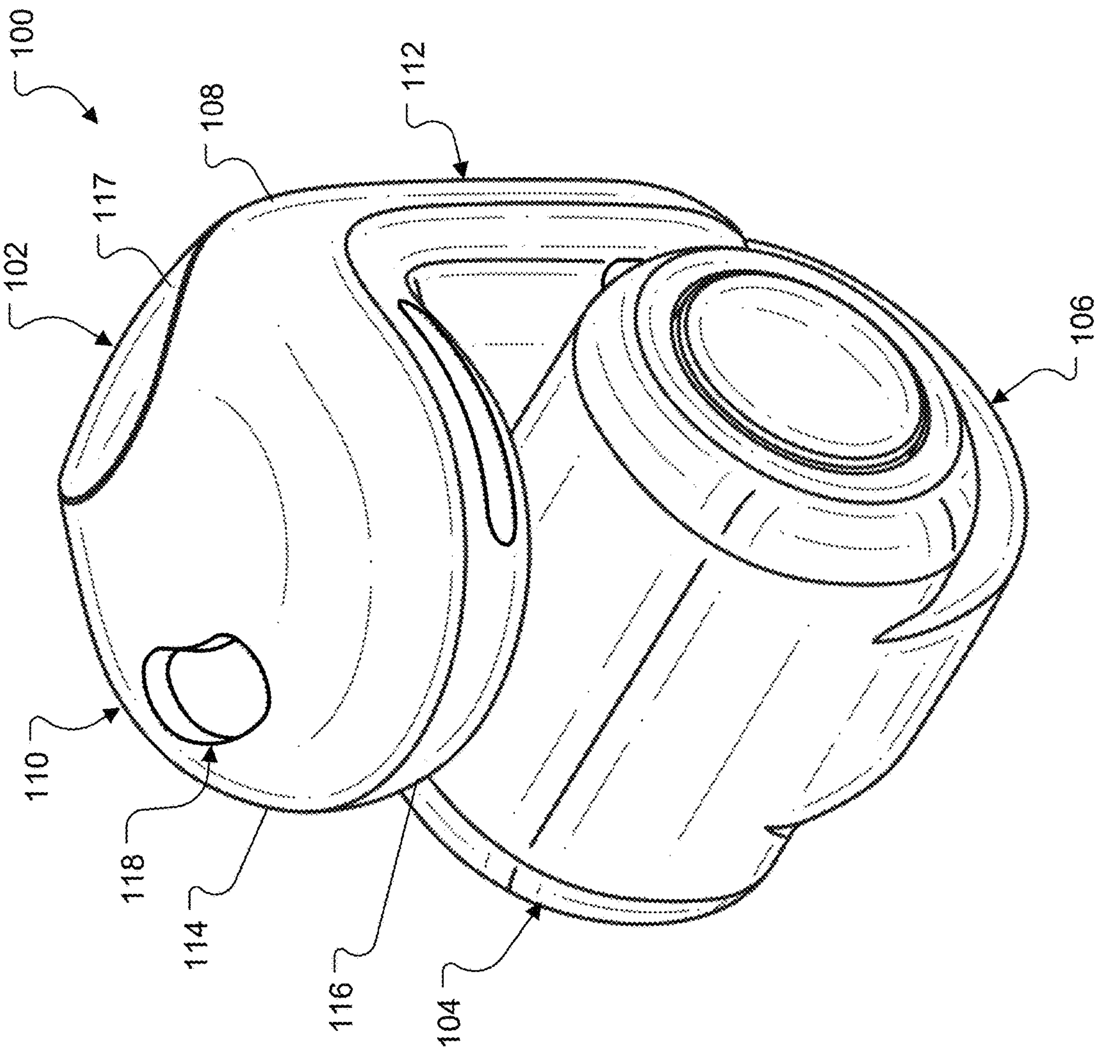
FIGS. 1A-1C are perspective, front, and rear views, respectively, of an open-ear headphone.

Headphones are commonly worn in, on or around the ear. Modern headphones often wirelessly connect to a personal device, such as a smartphone. This wireless connection requires a radio frequency (RF) signal to be transmitted across a user's body, such as from the user's waist region to one (or both) of the user's ears. Signals propagate across a user's body via a surface wave effect, similar to a ground wave. Depending on the user's physical size (weight and height) the wireless performance may deteriorate. This is called cross body performance and is often measured in terms of audio quality and audio dropouts. Accordingly, there is a need for an efficient RF antenna to help overcome these issues.

To improve the efficiency and bandwidth of the antenna, a main PCB earth plane of a headphone is extended using a laser direct structuring (LDS) earth plane extension. The earth under the antenna shields the antenna from human dielectric and minimize detuning of the antenna.

Also, locating a battery behind an ear and running flexible PCB electrical connections to extend around the ear lobe helps to improve downward facing antenna radiation.

A secondary benefit of extending the earth plane is an alternative electrical "drain" path that might help to mitigate electrostatic discharge (ESD) issues.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

A headphone or earphone refers to a device that typically fits around, on, in, or near an ear and that radiates acoustic energy into or towards the ear canal. Headphones and earphones are sometimes referred to as earpieces, headsets, earbuds, sport headphones, or truly wireless in-ear (TWIE) products and can be wired or wireless. A headphone includes an electro-acoustic transducer driver to transduce audio signals to acoustic energy. The acoustic driver may be housed in an earcup, earbud, or other housing. Some of the figures and descriptions following show a single headphone device. A headphone may be a single stand-alone unit or one of a pair of headphones (each including at least one acoustic driver), one for each ear. A headphone may be connected mechanically and/or electrically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality, such as a microphone. A headphone may also be an open-ear device that includes an electro-acoustic transducer to radiate acoustic energy towards the ear canal while leaving the ear open to its environment and surroundings.

Wireless headphones play audio to a user based on information received from an audio source. An audio source may include a computing device (for example, a laptop computer, desktop computer, tablet, smartphone, or other electronic computing device) configured to communicate wireless signals encoding audio information to the wireless headphones. An antenna of the wireless headphones receives the wireless signals, generates electrical signals based on the wireless signals, and provides the electrical signals to transducer circuitry coupled to a printed circuit board (PCB) having an earth plane and supporting electronics circuitry. The earth plane may serve as the return path for current from components on the PCB. The transducer circuitry provides control signals to a transducer, such as a speaker. The transducer generates mechanical signals (i.e., audio) for playback to a user based on the control signals.

It is generally advantageous to tune a wireless headphone according to a resonant frequency of the antenna. An antenna's resonant frequency may depend on a length of a conductive path between the antenna and the PCB earth plane, as well as a distance from the antenna to the PCB earth plane. This disclosure is based, at least in part, on the realization that it may be beneficial to extend the antenna earth plane for improved antenna efficiency, bandwidth and isolation of antenna from human body dielectric.

In various implementations, a headphone incorporates metallization, e.g., laser direct structuring (LDS), on a surface of an enclosure to increase the available earth plane. A PCB earth plane is connected to the LDS metallization using spring contact(s). This enlarged earth plane increases the effective electrical length of the antenna assembly and therefore increases the efficiency of an LDS antenna printed on a top enclosure.

Figure 1B:
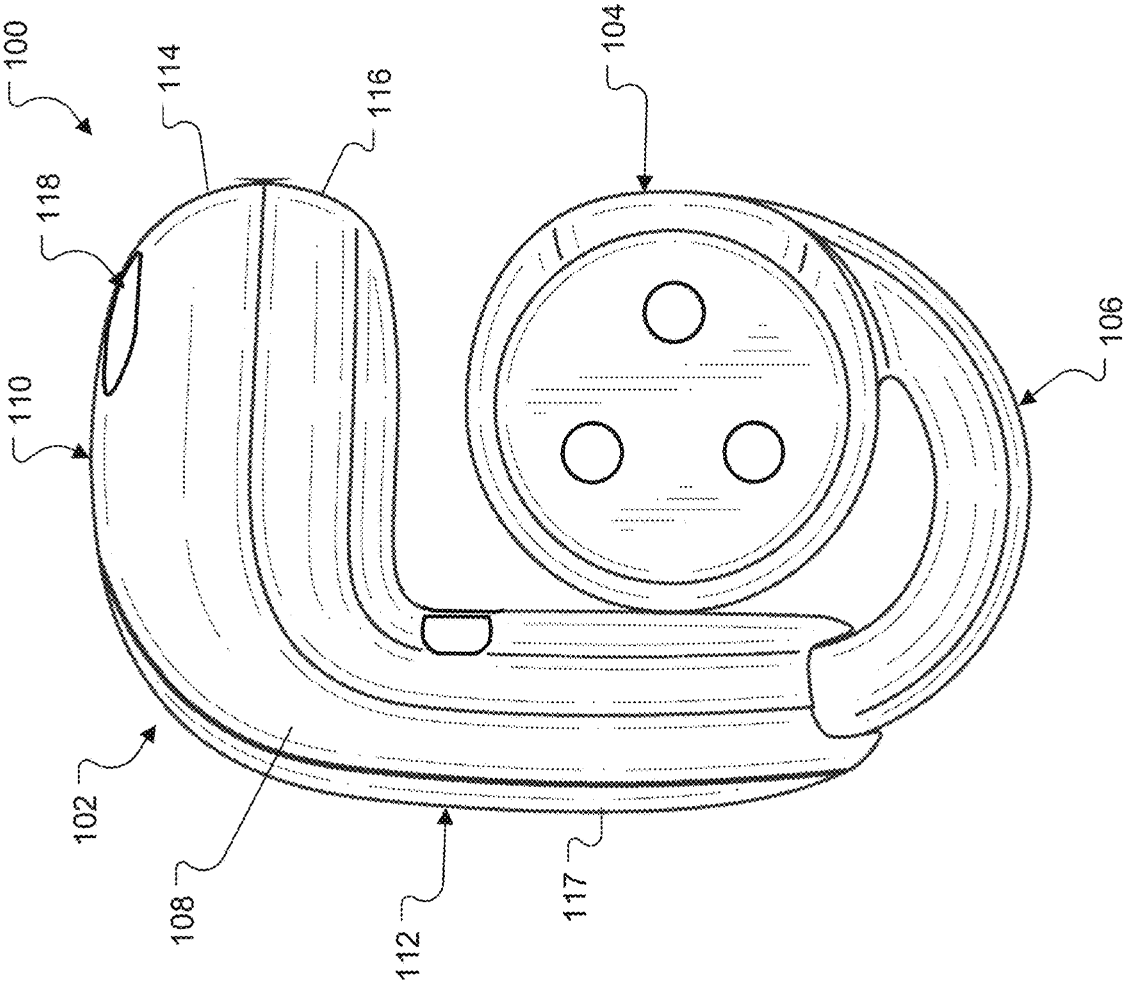
Figure 1C:
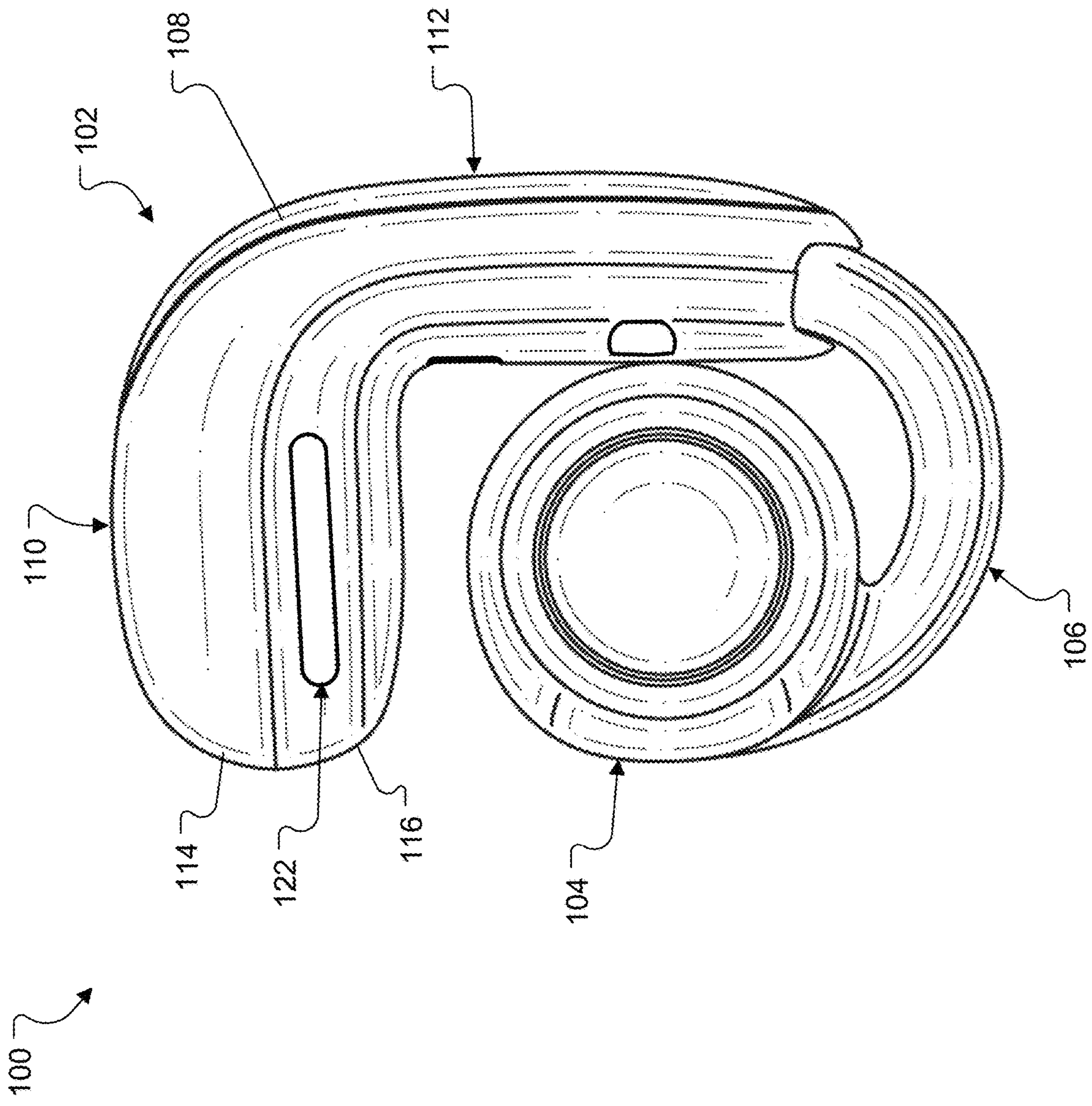

FIGS. 1A-1C illustrate an exemplary headphone with an open-ear form factor according to various implementations. The open-ear headphone 100 includes acoustic module 102, a battery module 104, and a connecting portion 106 that runs between and couples the acoustic module 102 to the battery module 104.

The acoustic module 102 includes a housing 108 that defines an acoustic enclosure 110 and an electronics enclosure 112, which are arranged substantially perpendicular to each other. The housing 108 is a multi-piece housing that includes a first (top) housing portion 114 and a second (bottom) housing portion 116. In some examples, the housing 108 may also include a third housing portion 117 (aka "cap"). The first, second and third housing portions 114, 116, 117 may be formed of a hard polymeric material, optionally from the group of Acrylonitrile Butadiene Styrene (ABS), Polycarbonate/Acrylonitrile Butadiene Styrene (PCB/ABS), polyetherimide (PEI), or stereolithography (SLA) resin. The first and second housing portions 114, 116 may be secured to each other, e.g., via adhesive or laser welding. Similarly, the second and third housing portions 116, 227 may be secured to each other, e.g., via adhesive or laser welding.

The acoustic enclosure 110 is configured to be located in the concha of the outer ear of the user. Generally, the outer ear (also known as the auricle or pinna) of a human includes a concha that is immediately adjacent to the entrance to the ear canal, which is underneath (or, behind) the tragus. The concha is divided by the helix crus into a lower portion termed the cavum conchae and an upper portion termed the cymba conchae. The cavum conchae is a generally bowl-shaped feature that is directly adjacent to the ear canal. The cavum conchae typically includes a depression bordered by the anti-tragus, which is the lower part of the anti-helix and/or bordered by the lobule. The lobule (i.e., the earlobe), which is at the lower end of the helix, is typically just below the anti-tragus.

Figure 2:
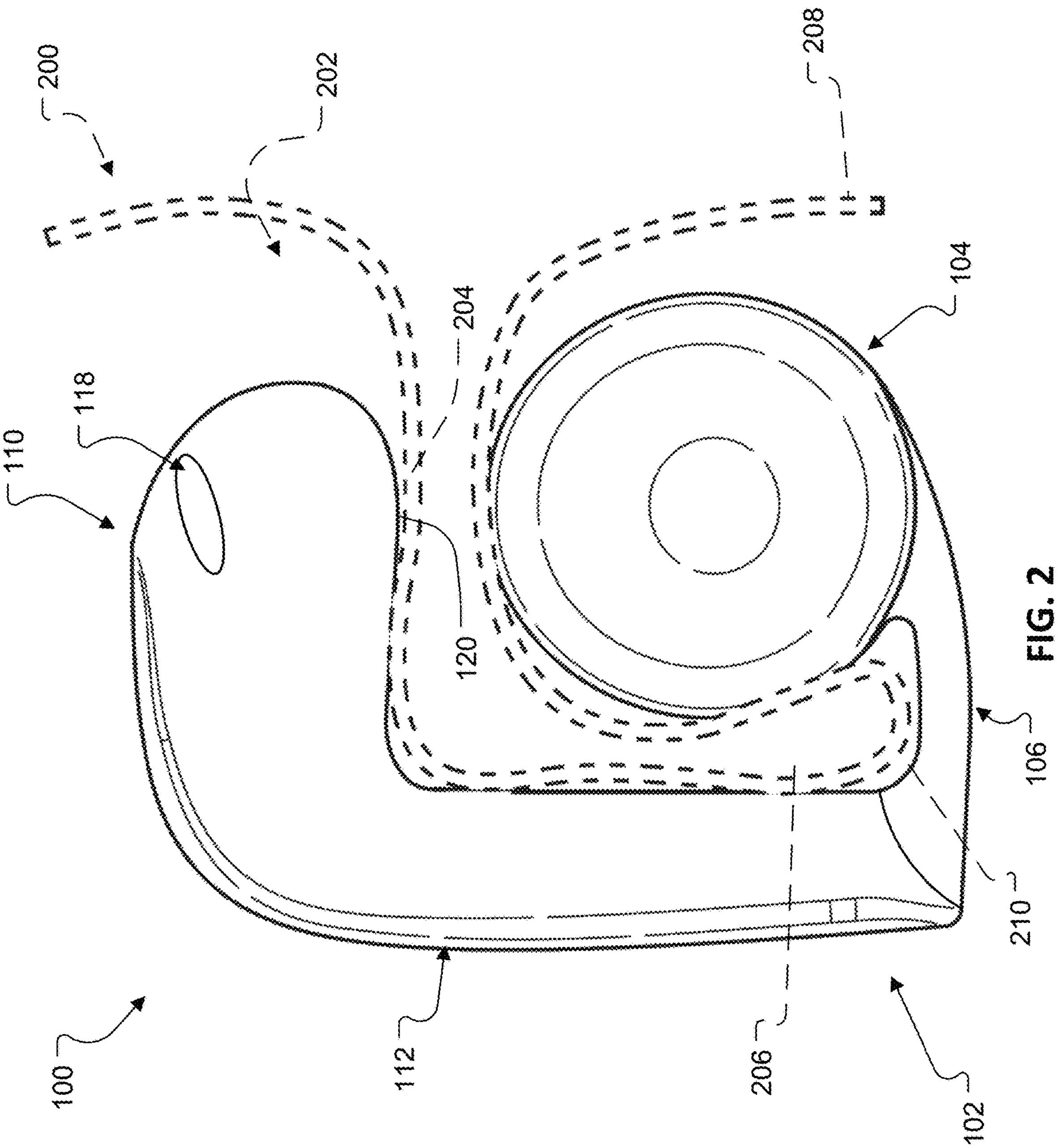
FIG. 2 illustrates how the open-ear headphone of FIGS. 1A-1C interfaces with the outer ear.

The electronics enclosure 112 extends between the acoustic enclosure 110 and the connecting portion 106 and is configured to pass over the outer side of the ear (e.g., at least one of the anti-helix and helix and lobule of the outer ear). The housing 108 can be generally "L"-shaped from the side (as shown in FIG. 1B) with the electronics enclosure 112 running at about a right angle to acoustic module 110. Overall, the open-ear headphone 100 is generally "C"-shaped with the connecting portion 106 running at about a right angle to the electronics enclosure 112 and leading to the battery module 104, as shown in FIG. 2. In an example, the battery module 104 can be generally cylindrical such that it is configured to hold a generally cylindrical battery power source (e.g., a rechargeable battery). The battery module 104 may also support electrical contacts to enable charging of the battery. The battery module 104 may include a battery housing that supports the battery. The battery housing may be formed of a hard polymeric material, optionally from the group of Acrylonitrile Butadiene Styrene (ABS), Polycarbonate/Acrylonitrile Butadiene Styrene (PCB/ABS), polyetherimide (PEI), or stereolithography (SLA) resin. The battery housing may be encased in an elastomeric cover layer, e.g., a silicone cover layer. The elastomeric cover layer may be formed integrally with the connecting portion 106. Additional details regarding the construction of the connecting portion and the battery module may be found in U.S. patent application Ser. No. 17/590,509, filed Feb. 1, 2022, titled "Open Ear Headphone," now U.S. Pat. No. 11,683,631, which issued on Jun. 20, 2023, the complete disclosure of which is incorporated herein by reference.

FIG. 2 illustrates how the open-ear headphone 100 of FIGS. 1A-1C interfaces with the outer ear 200. As shown in FIG. 2, the acoustic enclosure 110 sits in the cavum conchae 202 of outer ear 200. As explained in more detail elsewhere herein, in certain implementations there is a first sound-emitting opening 118 that emits sound produced by an electro-acoustic transducer in the acoustic enclosure 110. Sound-emitting opening 118 is spaced from and proximate the user's ear canal opening (not shown). In this example the acoustic enclosure 110 has lower portion 120 that is outwardly convex and is configured to sit in lower concavity 204 of cavum conchae 202. In certain cases, the weight of the open-ear headphone hangs from and is suspended from the cavum conchae; this holds the open-ear headphone 100 on the ear without the need for it to clamp to the ear. To add compliance to lower portion 120 such that it sits on the uneven surface of concavity 204, there may be a cushion or other compliant or compressible member (not shown) on all or part of lower portion 120. If light clamping of the open-ear headphone 100 to the ear is desirable, compliance can be built in. For example, at least the connecting portion 106 could be made of an elastomer or include a hinge element so that it can flex relative to the electronics enclosure 112, thus altering the location of the battery module 104 and altering the thickness of the gap between the electronics enclosure 112 and the connecting portion 106 that encompass ear portion 206. A suitable compliant elastomer may have a hardness of 80 durometer shore A.

The open-ear headphone 100 is configured such that when the acoustic enclosure 110 is placed into the cavum conchae 202 of the ear the electronics enclosure 112 passes over at least one of the anti-helix, the helix, and the lobule of the ear, any one or more of these portions of ear 200 designated generally as 206 in FIG. 2. The user is able to pivot the body to a comfortable or otherwise desirable position of the body on the outer ear. See FIG. 3A for a more complete description of the outer ear and the manner in which the electronics enclosure 112 overlies the outer ear. The battery module 104 is behind the outer ear. In other words, it is located between outer ear 200 and the adjacent portion of head 208, as shown in FIG. 2. The connecting portion 106 connects the electronics enclosure 112 and the battery module 104 and is configured to pass over edge 210 of outer ear 200.

Figure 3A:
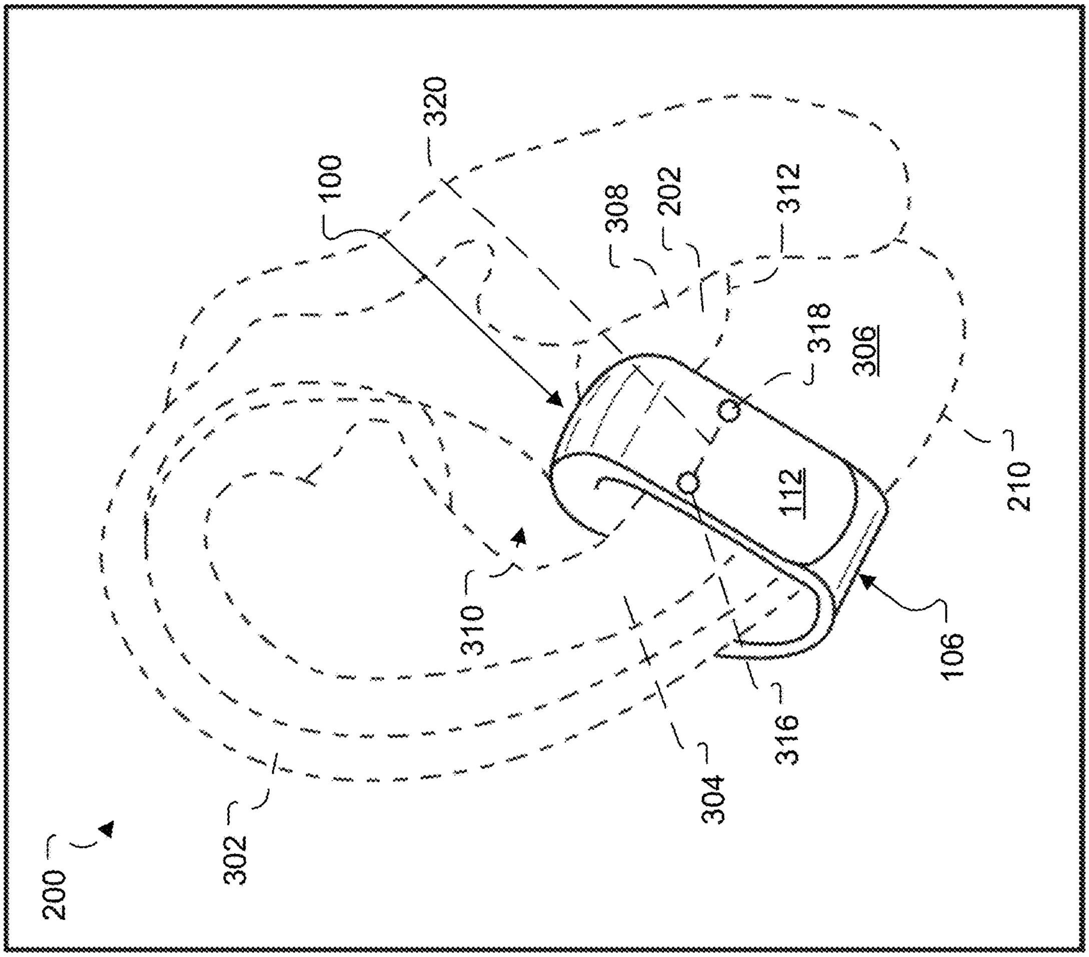
FIGS. 3A and 3B are side and rear perspective views, respectively, of the open-ear headphone in place on an ear.
Figure 3B:
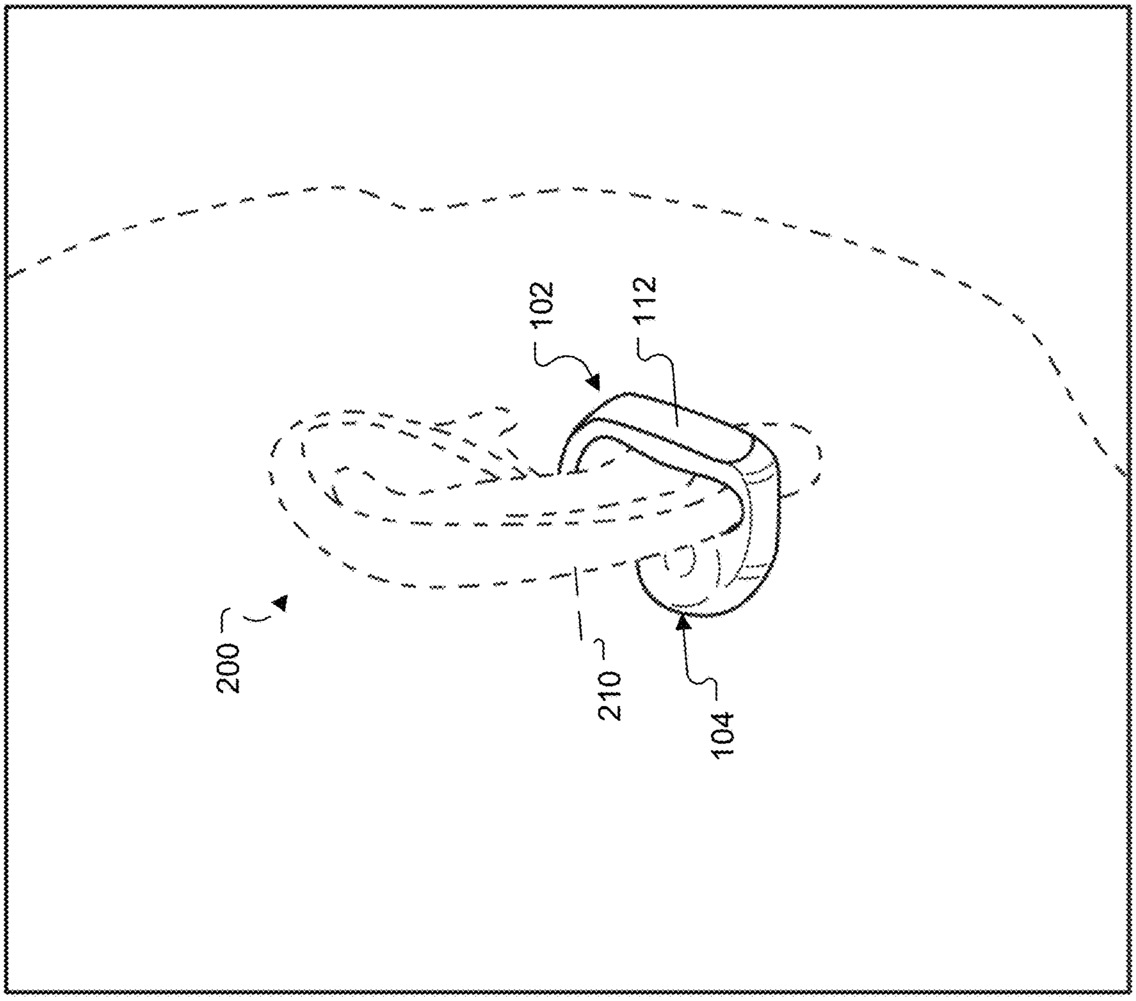

FIGS. 3A and 3B are side and rear perspective views, respectively, of the open-ear headphone 100 in place on outer ear 200. The manner in which the open-ear headphone 100 interacts with the outer ear 200 may be better understood with reference to parts of the outer ear 200 illustrated in FIG. 3A. Outer ear 200 includes helix 302, anti-helix 304, lobule 306, tragus 308, and concha 310 that includes the cavum conchae 202 with anti-tragus 312 forming the lower border of the cavum conchae 202. Depending on the user's outer ear anatomy and the user's preference for the fit of the open-ear headphone, the electronics enclosure 112 can be configured to pass over one or more of helix 302, anti-helix 304, lobule 306, and anti-tragus 312. The connecting portion 106 passes over the outer edge 210 of the ear at the location of one or more of helix 302, anti-helix 304, and lobule 306. As described herein, in certain implementations, the open-ear headphone 100 is positioned to detect noise proximate the ear canal.

In some examples, open-ear headphone 100 carries one or more external microphones. External microphones can be used to sense the user's voice and/or sense environmental sounds and/or as feed-forward microphones of an active noise cancelation system; these and other functions of external microphones of a headphone are known in the technical field and so are not further described herein. In this example, external microphones 316 and 318 may be located on opposed sides of the electronics enclosure 112 such that they lie generally along axis 320 that intersects or passes close to the expected location of the user's mouth. This way the microphones can be beam-formed if desired. Beamforming is also known in the technical field and so is not further described herein.

Figure 4:
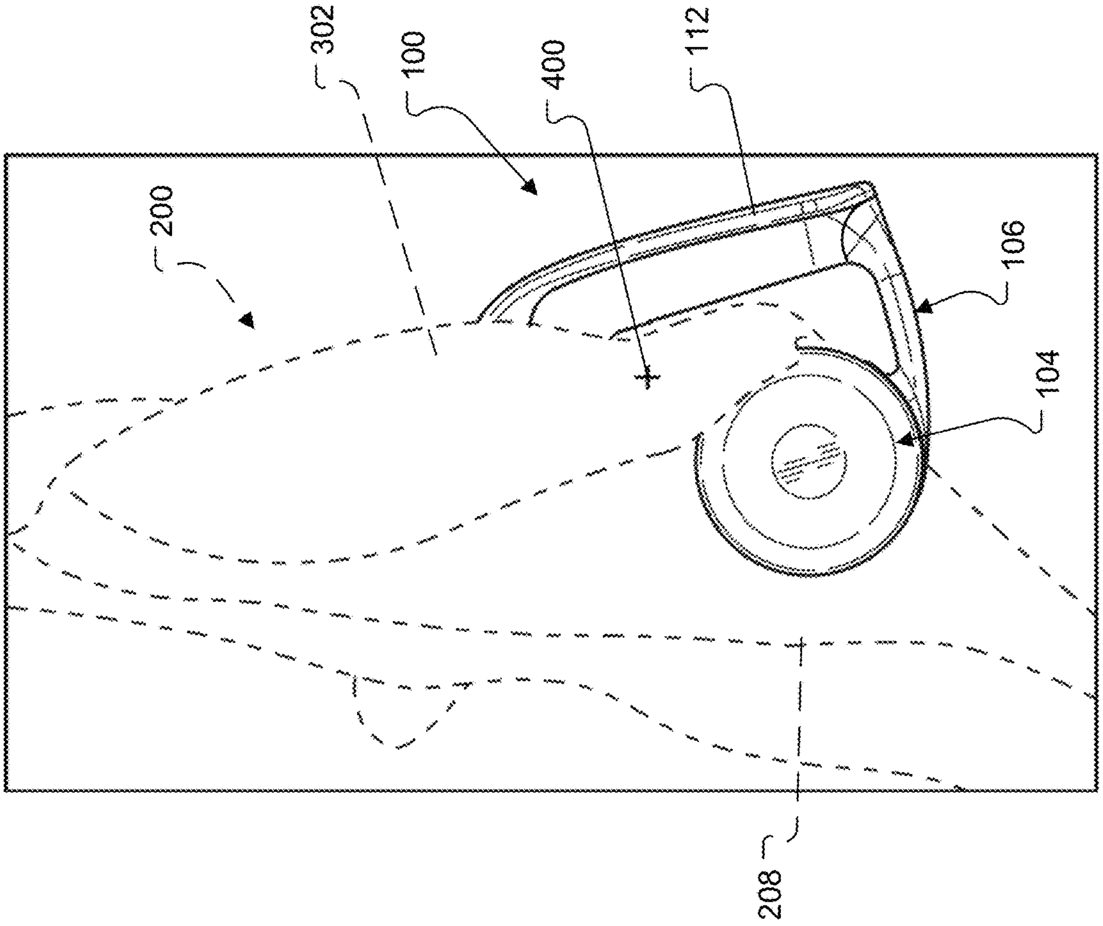
FIG. 4 is a rear view of the open-ear headphone in place on an ear, illustrating its center of gravity.

FIG. 4 is a rear view of the open-ear headphone 100 in place on outer ear 200, illustrating its center of gravity 400. The center of gravity is between acoustic enclosure 110 (only partially visible in this view) and battery module 104. In some examples the center of gravity is in the outer ear, e.g., in the helix 302.

Figure 5A:
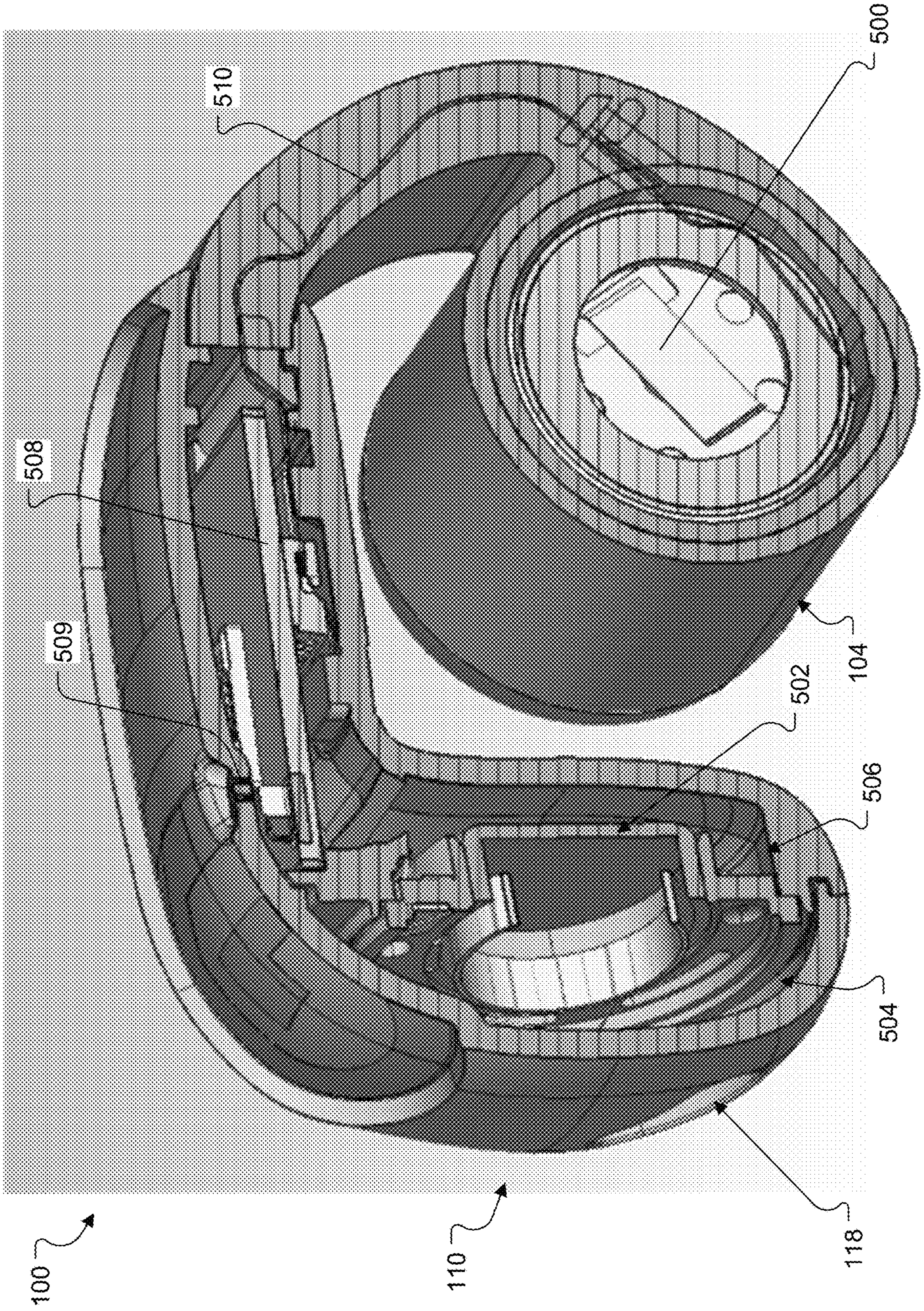
FIG. 5A is a schematic partial cross-sectional view of the open-ear headphone of FIGS. 1A-1C shown without a third housing portion ("cap") and exposing an antenna.
Figure 5B:
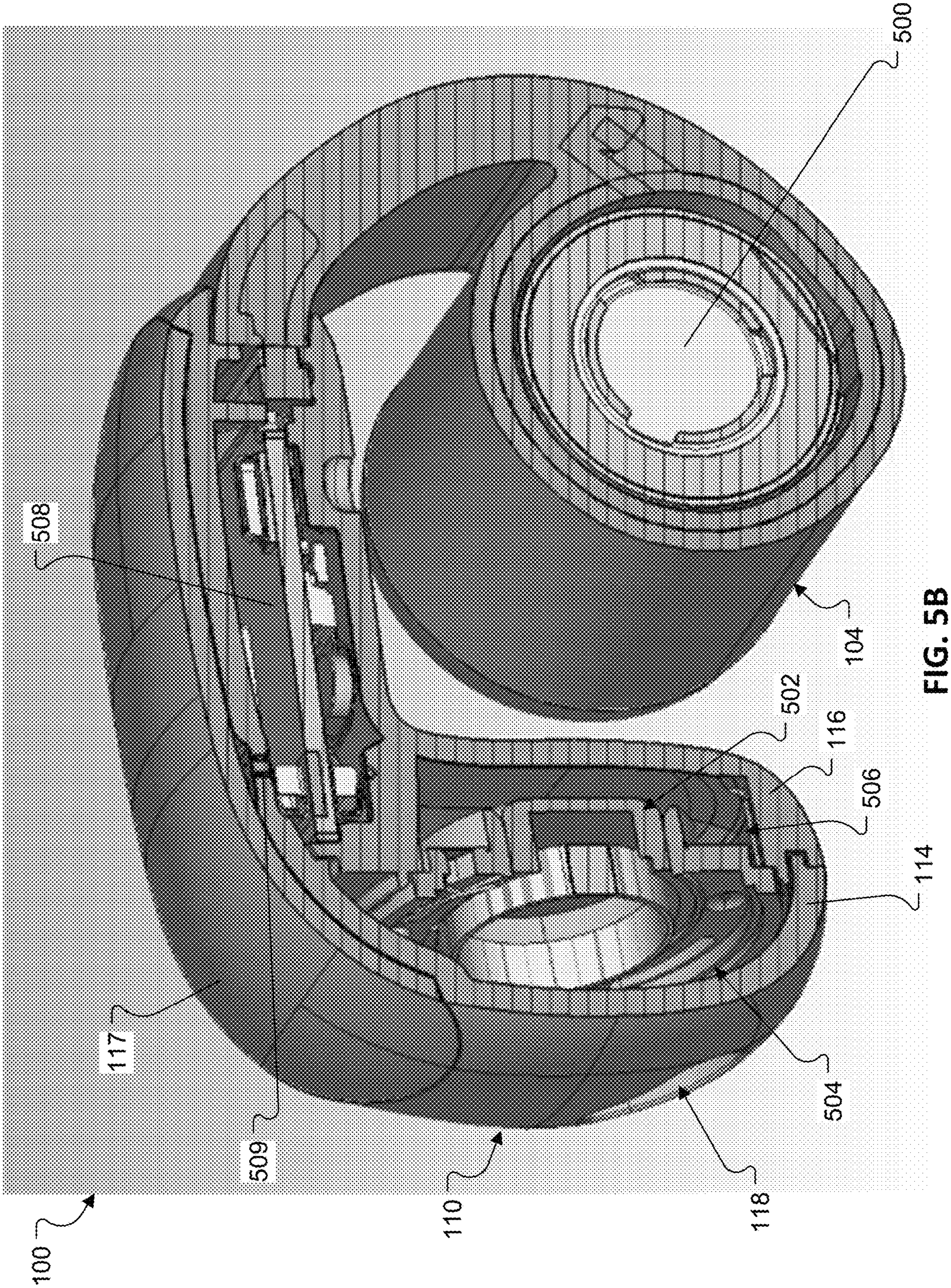
FIG. 5B is a schematic partial cross-sectional view of the open-ear headphone of FIG. 5A shown with a third housing portion ("cap") which covers the antenna.

FIGS. 5A and 5B are cross-sectional views of the open-ear headphone 100 illustrating battery 500 carried inside of battery module 104. The acoustic enclosure 110 carries an electro-acoustic transducer 502. The electro-acoustic transducer 502 is arranged such that a first radiating surface of the transducer radiates acoustic energy into a first acoustic cavity 504 and a second, opposite radiating surface of the transducer radiates acoustic energy into a second acoustic cavity 506. The first acoustic cavity 504 is acoustically coupled to the first sound emitting opening 118 (FIG. 1B). The first sound-emitting opening 118 is in the end of the acoustic enclosure 110 that is closest to user's ear canal opening when the device is worn. The illustrated example shows an open-ear headphone 100 that is specifically designed to be carried in a user's right ear. A mirror-image of the design would be used for a headphone for the left ear. Depending on the location of the sound-emitting opening 100 and the specific configuration and the symmetry of the acoustic enclosure 110, the open-ear headphone 100 may be able to be carried on either the left or the right ear. A printed circuit board (PCB) 508 is located in the electronics enclosure 112 and is electrically coupled to the battery 500 via a flex circuit element 510 (aka "flexible printed circuit"). The PCB 508 may support various electronic components such as a digital signal processor (DSP) for processing audio signals, an audio amplifier, a battery charger, a wireless transceiver (such as Bluetooth) for sending and receiving wireless data, computer memory components, etc. The PCB 508 may include a rigid PCB including one or more electrically conductive (e.g., copper) layers supported and separated by a dielectric material, e.g., FR4. Electrically conductive wires 616 (aka "wiring," see FIG. 6A) electrically connect the PCB 508 to electro-acoustic transducer 502, to carry at least power and audio signals to the transducer. User interface elements (e.g., physical buttons, capacitive sense, or a force touch element such as a strain gauge can be built into the body portion if desired).

In some examples, the acoustic enclosure 110 may include a second sound-emitting opening 122 (FIG. 1C) that is configured to be farther from the ear canal opening than is the first sound-emitting opening 118. The first and second sound-emitting openings 118, 122 can be arranged to accomplish a dipole-like pattern that can result in sound cancelation that reduces spillage of the sound that can be heard by others. In one example, the electro-acoustic transducer 502 produces sound pressure in the first and second acoustic cavities 504, 506 of the acoustic enclosure 110, and the first sound-emitting opening 118 is fluidly coupled to the first (front) acoustic cavity 504 and the second sound-emitting opening 122 is fluidly coupled to the second (back) acoustic cavity 506. As is known in the technical field, sound-emitting openings can be covered by resistive or environmentally protective elements such as cloths or weaves.

Figure 6A:
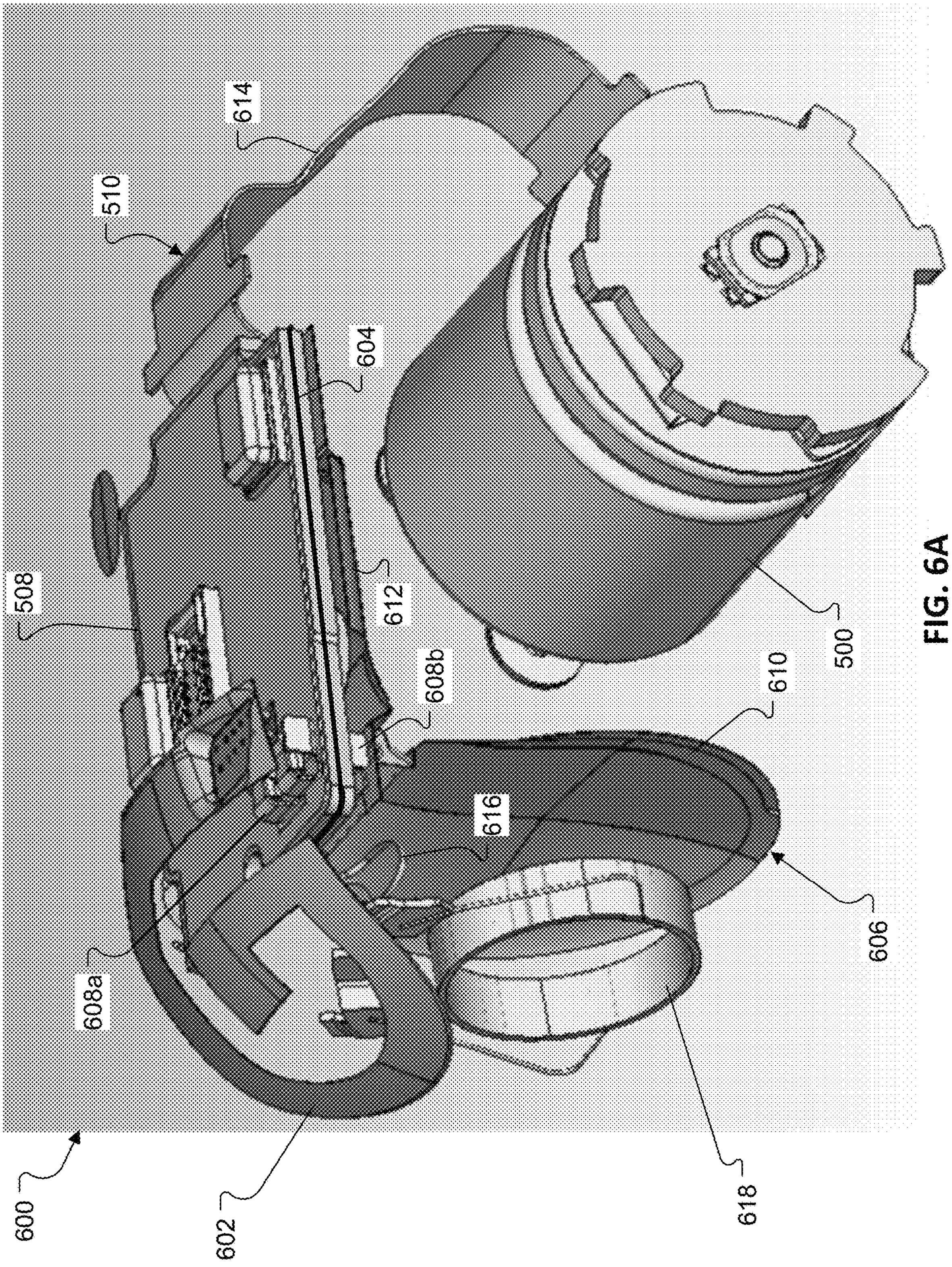
FIGS. 6A and 6B are perspective views of an antenna assembly of the open-ear headphone of FIGS. 1A-1C, shown without the housing.
Figure 6B:
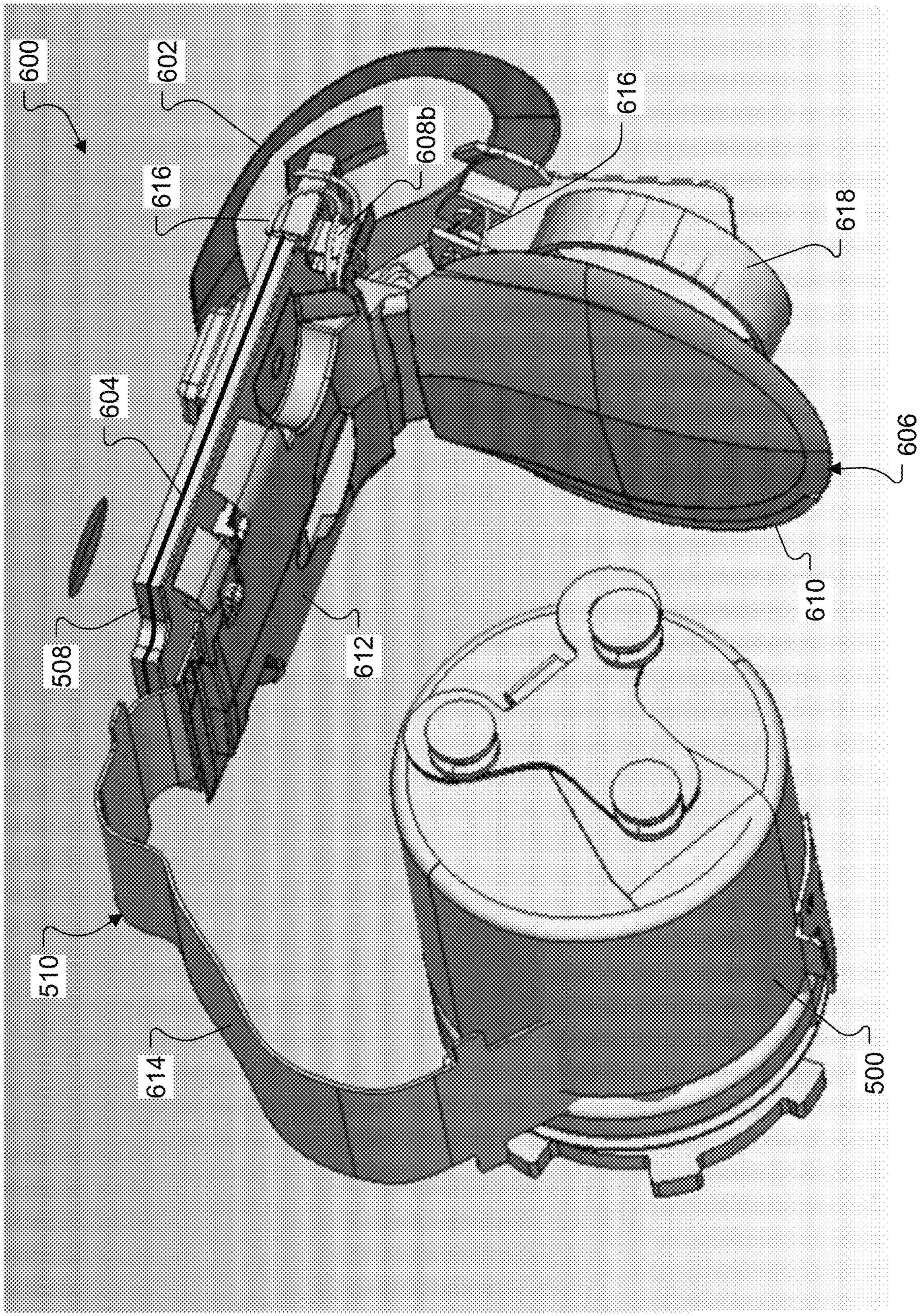

FIGS. 6A & 6B, illustrate the components of an antenna assembly 600 of the open-ear headphone 100. The antenna assembly 600 includes an antenna 602. The antenna 602 may be a monopole, F antenna, inverted F antenna, or patch construction (many other antenna variants are possible). The antenna 602 may be formed directly on a surface of the housing 108, e.g., on an outer surface of the top housing portion 114, using laser direct structuring (LDS). The LDS process uses a thermoplastic material, doped with a (non-conductive) metallic inorganic compound activated by means of laser. The basic component is single-component injection molded, with practically no restrictions in terms of 3D design freedom. A laser then writes the course of the later circuit trace on the plastic. Where the laser beam hits the plastic the metal additive forms a micro-rough track. The metal particles of this track form the nuclei for the subsequent metallization. In an electroless copper bath, the conductor path layers arise precisely on these tracks. Successively layers of copper, nickel and gold finish can be raised in this way.

In the illustrated example, the antenna 602 is formed on an outer surface of the top housing portion 114 (see, e.g., FIG. 5A) and the antenna 602 may be covered with the third housing portion 117 (see, e.g., FIG. 5B). In this position, the antenna 602 extends off the edge of and away from the PCB 508, which is located in the electronics enclosure 112. So, unlike a traditional inverted-F antenna, the antenna 602 is not inverted over the PCB 508 (rather the EPE 610) and, instead, extends away from the PCB 508 at a non-zero angle, e.g., at an angle of 15 degrees to 90 degrees. In this position, the antenna 602 is located over the RF decoupled transducer 502, and away from electronic noise sources on the PCB 508. This minimizes the impact of switch mode power supply and other digital signals on receiver sensitivity.

The antenna assembly 600 also includes an electrically conductive earth plane 604 (aka "antenna earth plane") which may be formed in one of the electrically conductive layers of the PCB 508. The antenna connects to the earth plane 604 and the antenna feed pin to the transceiver.

Notably, the antenna assembly 600 also includes an earth plane extension 606. Like the antenna, the earth plane extension 606 may be formed directly on a surface of the housing 108, e.g., on an inner surface of the bottom housing portion 116, using LDS to increase the available earth plane. This enlarged earth plane, increases the effective radiating surface area of the antenna assembly and therefore increases the bandwidth and efficiency of the LDS antenna 602 printed on the top housing portion 114.

In the illustrated example, the earth plane extension 606 includes a first section 610 that is formed on an inner surface of the bottom housing portion 116 in a region of the second acoustic cavity 506 in the acoustic enclosure 510 and a second section 612 that extends substantially perpendicular to the first section 610 and extends substantially parallel to the PCB 508 on an inner surface of the bottom housing portion 116 in the region of the electronics enclosure 112.

Spring contacts provide electrical connections between the PCB 508 and the antenna 602 and the earth plane extension 606. In that regard, a first set of spring contacts 608*a*, supported on a first surface of the PCB 508, electrically couple the antenna 602 to PCB 508. The first set of spring contacts 608*a* provide a feed for the antenna and an electrical connection to the earth plane on the PCB 508. In that regard, the antenna 602 may include vias 509 (FIG. 5A)

that extend through the first housing portion 114 and provide an electrically conductive path to the spring contacts 608*a*, which are located within the electronics enclosure 112. A second set of spring contacts 608*b*, supported on a second, opposite surface of the PCB 508, provide a connection between the earth plane on the PCB 508 and the earth plane extension 606. The spring contacts may be formed of steel and plated with trivalent gold plating to help reduce loss attributable to the steel. An additional benefit is that the LDS earth plane extension and spring contacts provide an ESD path.

Other components that might contribute to the RF performance of the headphone include the conductive traces 614 on the flex circuit element 510 and battery. Note that the transducer 502 and wires 616 are RF decoupled on the PCB 508 to avoid RF energy being absorbed by the transducer 502 and reducing the antenna efficiency.

Figure 7A:
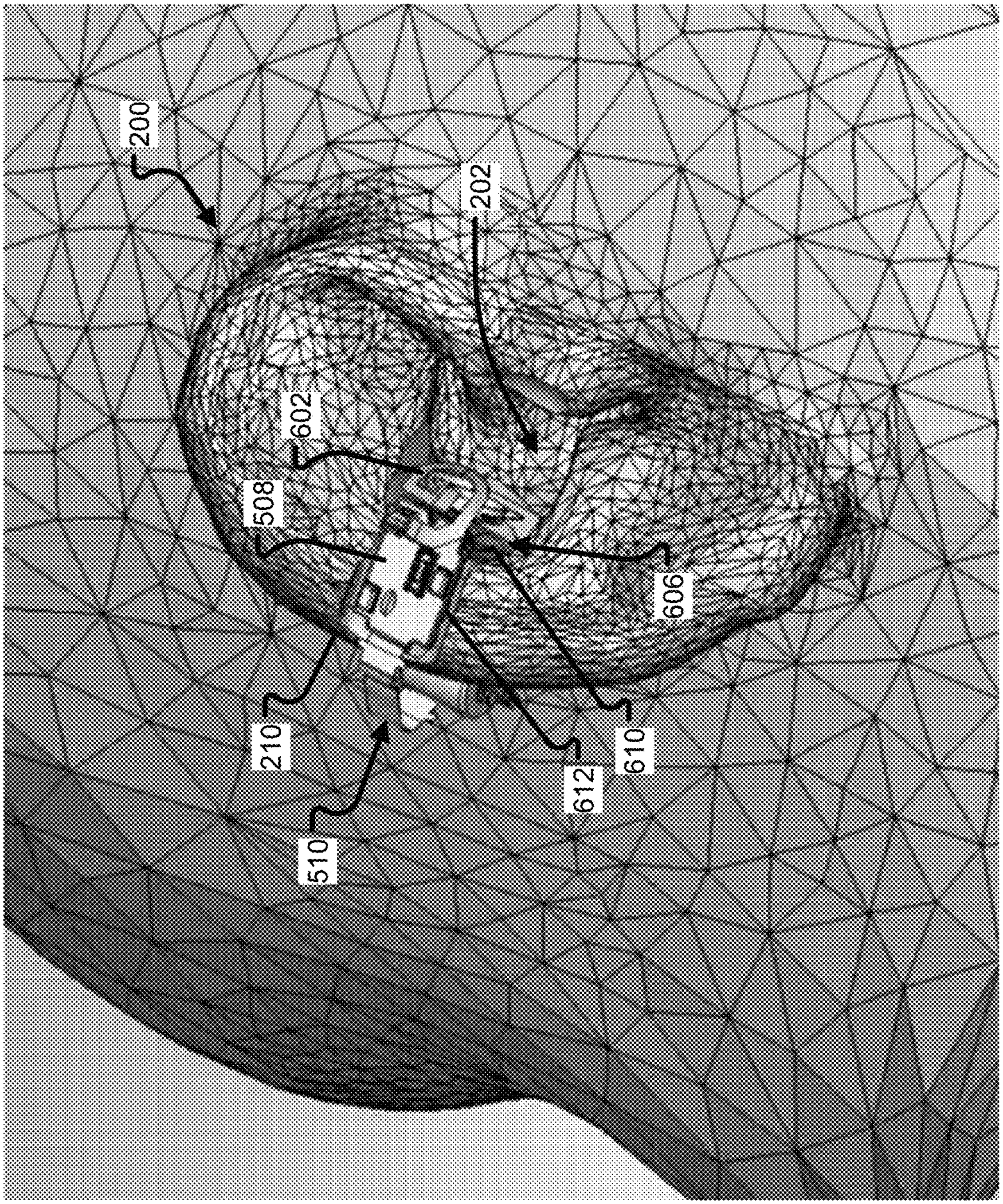
FIGS. 7A and 7B are perspective and partial cross-sections views, respectively, illustrating how the antenna assembly of FIGS. 6A and 6B is arranged to sit in a human ear.
Figure 7B:
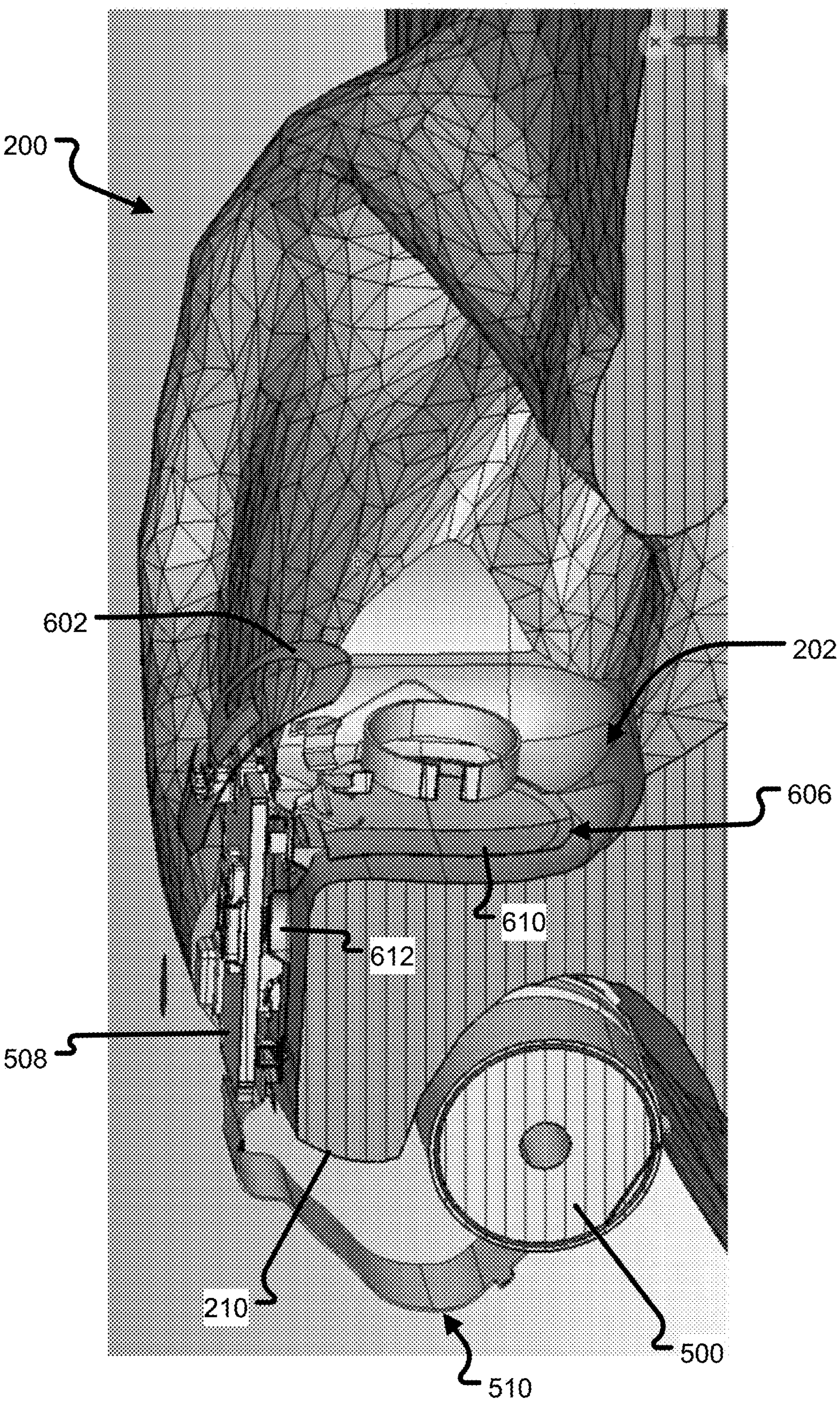

FIGS. 7A & 7B illustrate the general position of the antenna assembly 500 relative to the human ear 200 when the headphone 100 is worn. The antenna 602 and the first section 610 of the earth plane extension 606 sit in and/or overlie a bowl of the cavum conchae 202.

The PCB 508 and the second section 612 of the earth plane extension 606 pass over the outer side of the ear (e.g., at least one of the helix, anti-helix, lobule, and anti-tragus). The flex circuit element 510 passes over the outer edge 210 of the ear at the location of one or more of the helix, the anti-helix, and the lobule of the ear 200.

Notably, the location of the antenna 602 itself is away from, off to side of, the electrical components and circuitry on the PCB 508, so that electrical noise (such as power supply and other noise sources) does not get into the antenna 602 easily. In addition, the earth plane extension 606 sits between the lossy material of the human body (e.g., the skin and cartilage of the ear) and the antenna 602 which helps to inhibit detuning of the antenna 602. That is, the earth plane extension 606 helps to isolate the antenna 602 from the human ear dielectric which detunes the antenna and reduces efficiency.

Furthermore, RF energy tends to couple onto the flex circuit element 510, battery 500 in the connecting portion 106. Because the flex circuit element 510 wraps around the bottom of the ear, it provides a radiating surface that enhances downward facing radiation, e.g., toward the user's shoulder. This form factor helps to increase the amount of radiated power in a downward direction, which can help improve cross-body RF performance.

Further, the RF energy coupled onto element 510 can be enhanced by making tracks wide and adding an additional earth below the tracks on opposite side of flex circuit element 510.

Accordingly, the form factor of this construction may be particularly beneficial from an RF perspective because, among other things: (i) the antenna efficiency is good due to the LDS earth plane extension, which increases the area of the earth plane; (ii) the location of the antenna itself is away from, off to side of, electronic noise sources, so noise does not get into the antenna and desensitize the receiver as easily; (iii) the earth plane extension is positioned between the user's body (specifically, the human ear dielectric) and the antenna, which can help to inhibit detuning of the antenna; and (iv) the RF coupling with the traces that run through the connecting portion helps to improve the amount of radiated power in a downward direction—i.e., the location of the battery behind the ear and flexible PCB electrical connections that extend around the ear lobe helps with downward facing antenna radiation.

OTHER IMPLEMENTATIONS

While examples have been provided with respect to an open ear headphone, the concepts described herein are also applicable to other form factors, such as in-ear, on-ear, or around ear headphones, as well as in-ear hearing aids or audio eyeglasses. For example, an in-ear headphone, such as described in U.S. Pat. No. 11,115,745 (the '745 patent), which is described as having an LDS antenna in a first housing portion (referred to as the "cap" in the '745 patent) may also be provided with an LDS earth plane extension as described herein. Such an earth plane extension could be electrically connected to the "PCB ground plane" described in the '745 patent, e.g., via flexible printed circuitry, and may be formed on a second housing portion, e.g., the "housing" described in the '745 patent.

A number of implementations have been described. Nevertheless, it will be understood that additional modifications may be made without departing from the scope of the inventive concepts described herein, and, accordingly, other implementations are within the scope of the following claims.

What is claimed is:

1. A headphone comprising:

a housing containing:

an electro-acoustic transducer;

an antenna for wireless communication;

a printed circuit board (PCB) with electronics for driving the electro-acoustic transducer, the PCB comprising an earth plane electrically coupled to the antenna;

a transceiver configured to provide wireless communication via the antenna; and an earth plane extension that is electrically coupled to the PCB earth plane and formed directly on a first surface of the housing using laser direct structuring (LDS), the earth plane extension extending continuously across both (i) an acoustic enclosure defined by the housing and configured to be located substantially in a concha of an outer ear of a user and (ii) an electronics enclosure defined by the housing and configured to pass over an outer side of the ear, wherein the earth plane extension is interposed between the antenna and the user's ear when the headphone is worn.

2. The headphone of claim 1, wherein the antenna is formed directly on a second surface of the housing using LDS.

3. The headphone of claim 2, wherein the housing comprises a first housing portion and a separate, second housing portion that are mechanically secured together, and wherein the earth plane extension is formed directly on an inner surface of the first housing portion using LDS and the antenna is formed directly on an outer surface of the second housing portion using LDS.

4. The headphone of claim 1, wherein the electro-acoustic transducer is disposed within the acoustic enclosure and the PCB is disposed within the electronics enclosure, and wherein the antenna is located over the electro-acoustic transducer and extends away from the PCB.

5. The headphone of claim 1, wherein at least a portion of the earth plane extension is disposed within the acoustic enclosure.

6. The headphone of claim 1, wherein a first section of the earth plane extension is disposed within the acoustic enclosure and a second section of the earth plane extension is disposed within the electronics enclosure.

7. The headphone of claim 1, further comprising a battery module containing a battery and configured to be located behind the outer ear, and a connecting portion that mechanically couples the acoustic module to the battery module.

8. The headphone of claim 7, wherein a flexible printed circuit extends through the connecting portion and electrically connects the PCB to the battery.

9. The headphone of claim 8, wherein electrically conductive traces on the flexible printed circuit are RF coupled with the earth plane and the battery.

10. The headphone of claim 7, wherein the electronics enclosure is configured to pass over one or more of a helix, an anti-helix, a lobule, and/or an anti-tragus of the user's ear and the connecting portion is configured to pass over an outer edge of the user's ear at a location of one or more of the helix, the anti-helix, and/or the lobule of the user's ear when the headphone is worn.

11. The headphone of claim 1, wherein at least a portion of the earth plane extension is configured to sit between a user's cavum conchae and the antenna when the headphone is worn.

12. The headphone of claim 3, wherein the housing further comprises a third housing portion and the antenna is covered with the third housing portion.

13. The headphone of claim 1, wherein the earth plane extension is electrically coupled to the PCB via one or more spring contacts providing a conductive path between the PCB and the housing.

14. The headphone of claim 1, wherein the earth plane extension is configured to inhibit detuning of the antenna by electrically isolating the antenna from lossy material of the user's ear.

15. An open-ear headphone, comprising:

A.) an acoustic module configured to be located at least in part in a concha of an outer ear of a user and comprising:

i.) an electro-acoustic transducer and a first sound-emitting opening that is configured to emit sound produced by the acoustic transducer, and ii.) an antenna; and iii.) a printed circuit board (PCB) that is electrically coupled to the electro-acoustic transducer and comprising an earth plane that is electrically coupled to the antenna;

B.) a battery module containing a battery and configured to be located behind the outer ear; and C.) a connecting portion mechanically coupling the acoustic module to the battery module and comprising conductive elements that electrically connect the battery to the PCB, wherein the conductive elements are radio frequency (RF) coupled to the earth plane, wherein the acoustic module comprises a housing that encloses the electro-acoustic transducer, the antenna, and the PCB, and wherein an earth plane extension is electrically coupled to the PCB earth plane and is formed directly on a first surface of the housing and is electrically connected to the earth plane using laser direct structuring (LDS), the earth plane extension extending continuously across both (i) an acoustic enclosure defined by the housing and configured to be located substantially in a concha of an outer ear of a user and (ii) an electronics enclosure defined by the housing and configured to pass over an outer side of the ear, wherein the earth plane extension is interposed between the antenna and the user's ear when the headphone is worn.

16. The open-ear headphone of claim 15, wherein the housing is a muti-piece housing comprising a first housing portion and a second housing portion, wherein the earth plane extension is formed directly on an inner surface of the first housing portion using LDS and the antenna is formed directly on an outer surface of the second housing portion using LDS.

17. The open-ear headphone of claim 15, wherein the housing defines an acoustic enclosure configured to be located substantially in a concha of an outer ear of a user, and an electronics enclosure that is configured to pass over the outer side of the ear.

18. The open-ear headphone of claim 17, wherein the electro-acoustic transducer is disposed within the acoustic enclosure and the PCB is disposed within the electronics enclosure, and wherein the antenna is located over the electro-acoustic transducer and extends away from the PCB.

19. The open-ear headphone of claim 18, wherein the electro-acoustic transducer is RF decoupled on the PCB.

20. The open-ear headphone of claim 17, wherein the acoustic enclosure is arranged substantially perpendicular to the electronics enclosure.

21. The open-ear headphone of claim 15, wherein the conductive elements comprise electrically conductive traces on a flexible printed circuit that extends between the PCB and the battery.

22. The open-ear headphone of claim 15, wherein the earth plane extension is arranged to sit between the user's ear and the antenna when the headphone is worn.

* * * * *